United States Patent
Rudai et al.

(10) Patent No.: US 6,258,479 B1
(45) Date of Patent: Jul. 10, 2001

(54) METHOD FOR DETERMINING AMOUNT OF WATER TO BE ADDED TO A NICD CELL

(75) Inventors: Patrick M. Rudai, Clifton, NJ (US); Steven Hoenig, Staten Island, NY (US); Thirumalai G. Palanisamy, Morristown; Harmohan Singh, Rockaway, both of NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/378,256

(22) Filed: Aug. 20, 1999

(51) Int. Cl.[7] .......................... H01M 2/00; H01M 10/42; H01M 10/48
(52) U.S. Cl. .................. 429/61; 429/49; 429/50; 429/90; 429/91; 429/92; 429/93; 320/116; 320/118; 320/119; 320/120; 320/121; 320/122
(58) Field of Search ...................... 429/90, 91, 92, 429/93, 61, 63, 50, 51, 49; 320/116, 118, 119, 120, 121, 122

(56) References Cited

U.S. PATENT DOCUMENTS

| | | | |
|---|---|---|---|
| 4,937,528 | 6/1990 | Palanisamy | 324/430 |
| 5,049,803 | 9/1991 | Palanisamy | 320/20 |
| 5,250,903 | 10/1993 | Limuti et al. | 324/427 |
| 5,281,919 | 1/1994 | Palanisamy | 324/427 |
| 5,631,540 * | 5/1997 | Nguyen | 320/30 |
| 5,705,929 | 1/1998 | Caravello et al. | 324/430 |
| 6,106,968 * | 8/2000 | Johnson et al. | 429/50 |

FOREIGN PATENT DOCUMENTS

| | | | |
|---|---|---|---|
| 2020290 | 7/1970 | (FR) | H01M/45/00 |
| 2748608 | 11/1997 | (FR) | H01M/10/42 |
| 2147163 | 5/1985 | (GB) | H02J/7/00 |

* cited by examiner

*Primary Examiner*—Carol Chaney
*Assistant Examiner*—Angela J. Martin
(74) *Attorney, Agent, or Firm*—Loria B. Yeadon

(57) ABSTRACT

Deficiencies in the electrolyte level of the cells of NiCd battery can be detected by measuring the internal resistance of the cells. Initially, data is collected for a battery type and capacity, correlating measured internal resistance with the amount of water that must be added to bring the cell resistance to an acceptable value. Subsequently, cells of other batteries of the same type and capacity can be measured to determine how much water must be added and the levels quickly restored. The polarization value of the cells can be used lieu of the internal resistance in the same fashion.

4 Claims, 2 Drawing Sheets

METHOD FOR DETERMINING AMOUNT OF WATER TO BE ADDED TO A NICD CELL

GOVERNMENT STATEMENT

All or part of this invention was developed for the United States Navy under Government Contract No. N00164-96-C-0045. The U.S. Government may have certain rights to this invention under terms of the Contract.

BACKGROUND OF THE INVENTION

If a cell of a nickel cadmium (NiCd) battery is overcharged, electrolysis of the water may occur, decreasing the electrolyte level in the cell. If a proper electrolyte level is not maintained, the cell will not function properly. Although the electrolyte level can be physically measured, a noninvasive, rapid technique would be highly desirable.

SUMMARY OF THE INVENTION

The electrolyte level can be determined by observing the electrical or electrochemical behavior of the cell during a charge pulse. One method measures the internal resistance of the cells of the battery. Another method measures the polarization value of the cells. In either case, the measured quantity is correlated with an amount of water added to reduce the measured parameter to an acceptable value and restore the electrolyte level and the performance of the cell. One aspect of this technique is the process of determining the correlation between the measured parameter and the quantities of water added. Another aspect is the use of this correlation to restore the electrolyte level.

DETAILED DESCRIPTION OF THE INVENTION

Initially, the battery must be in a ready state. The battery, containing one or more cells, is attached to a charging system (not shown). The battery is charged for a period t at a charge rate C/ until each of the cells has an open-circuit voltage of at least $v_i$ volts. In the case of a NiCd battery, $v_i$=1.26 volts. The period t can be 15 minutes, although other values of t can be selected as suits the application. The charge rate C/ can be C/10, where C is the manufacturer's rated capacity of the battery, although the parameter can vary from greater than 1 to 100, or perhaps an even greater number, again depending on the application and the battery under test. For a battery having a capacity of 30 Ah, the charge current would be 3 amps.

Figure 1:
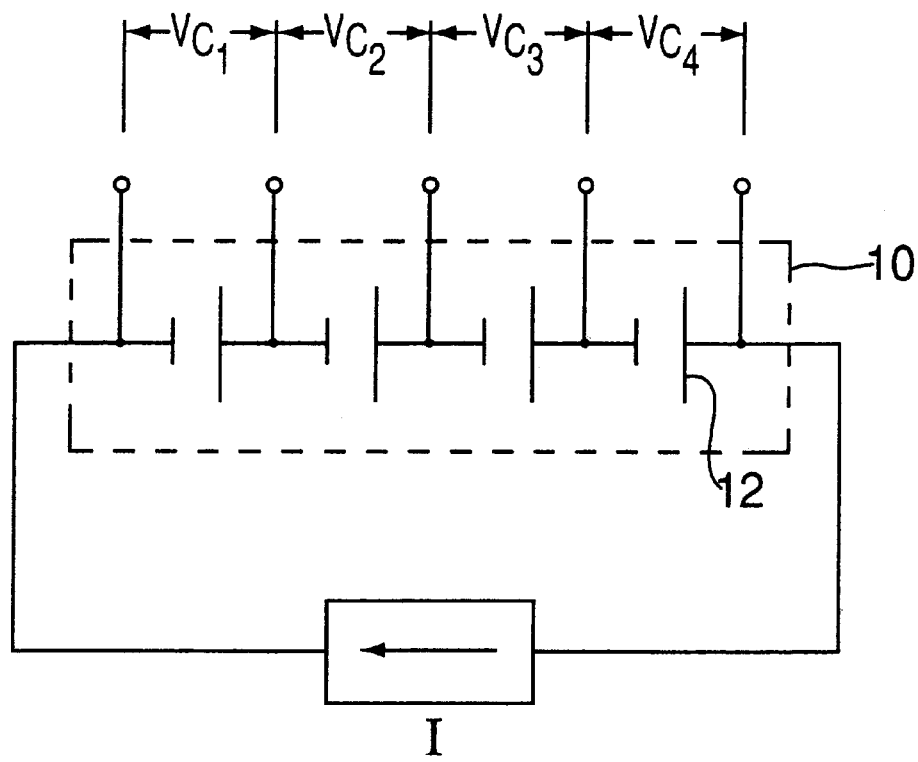
FIG. 1 is a schematic diagram of an apparatus for determining the amount of water to be added to the cells of a storage battery.
Figure 2:
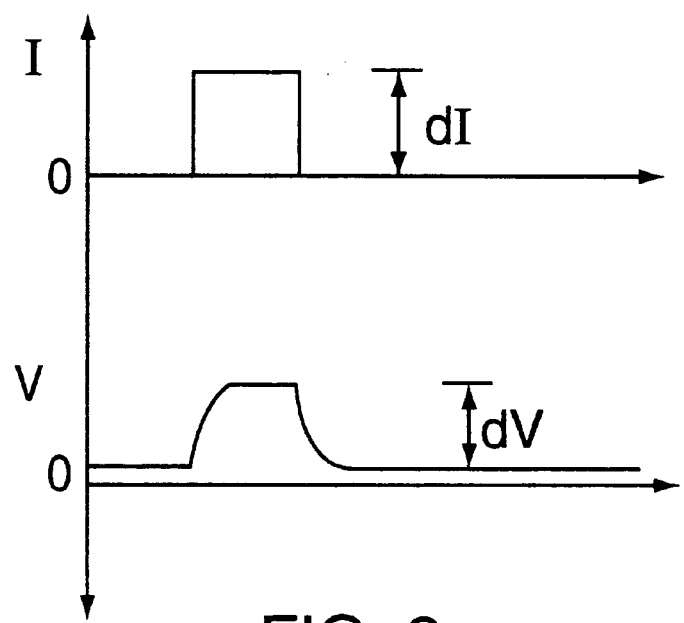
FIG. 2 is a waveform diagram of current and voltage for a cell under test.

Utilizing the circuit of FIG. 1, a battery 10 is subjected to an internal resistance test cycle. A step charge current or pulse of C amps is applied to the entire battery 10 (the value C set by the battery rating). Alternatively, a discharge pulse may be employed. The current starts at zero and goes to C instantaneously or nearly instantaneously, and is maintained at that value for a period of time, e.g., 5 seconds, after which it returns instantaneously to zero. As the step charge is applied, the battery response voltage is measured across each cell 12. The internal resistance of each cell 12 is determined by calculating the value of dV/dI during the falling portion of the step charge pulse (see FIG. 2), although one might use other portions of the pulse to measure dV/dI.

Depending on the level of electrolyte in a given cell 12, the value of dV/dI will vary. By adding water and then measuring dV/dI, the amount of water needed to return the value of cell resistance to an acceptable number can be determined. This relationship can be collected in a table or expressed as an algorithm (or depicted in a graph), as desired. Since there may be a time lag between adding water and the final value of dV/dI, one may need to perform the measurements iteratively to arrive at stabilized values of internal resistance. Following the iterative process, one would arrive at tables such as those shown below for 30 Ah and 10 Ah batteries for a 5 second pulse width (Tables A and B, respectively).

TABLE A

Water Addition Table for 30 Ah capacity-rated cells

| IR (m) | Water Addition (ml) |
|---|---|
| 2.0–2.5 | 3 |
| 2.5–4.0 | 6 |
| 4.0–5.5 | 9 |
| 5.5+ | 12 |

TABLE B

Water Addition Table for 10 Ah capacity-rated cells

| IR (m) | Water Addition (ml) |
|---|---|
| 4.0–5.0 | 1 |
| 5.0–7.5 | 2 |
| 7.5–12.0 | 3 |
| 12.0–18.0 | 4 |
| 18.0–27.0 | 5 |
| 27.0+ | 6 |

The tables illustrate the correlation between the measured internal resistance and the amount of water required to lower the cell resistance to an acceptable number and, thus, restore the electrolyte to its proper level. In the examples shown here, the values of acceptable maximum internal resistance, indicative of a proper electrolyte level, were selected to be 2 m and 4 m, per cell, for the respective storage batteries, although greater or lesser values could have been selected. Other pulse widths (t) and amplitudes (C) may be employed but of course will result in different table values. In these examples, the batteries utilized were manufactured by SAFT America, Inc., San Diego, Calif., model no. M81757/7-2 (10 Ah) and model no. M81757/9-3 (30 Ah).

Figure 4:
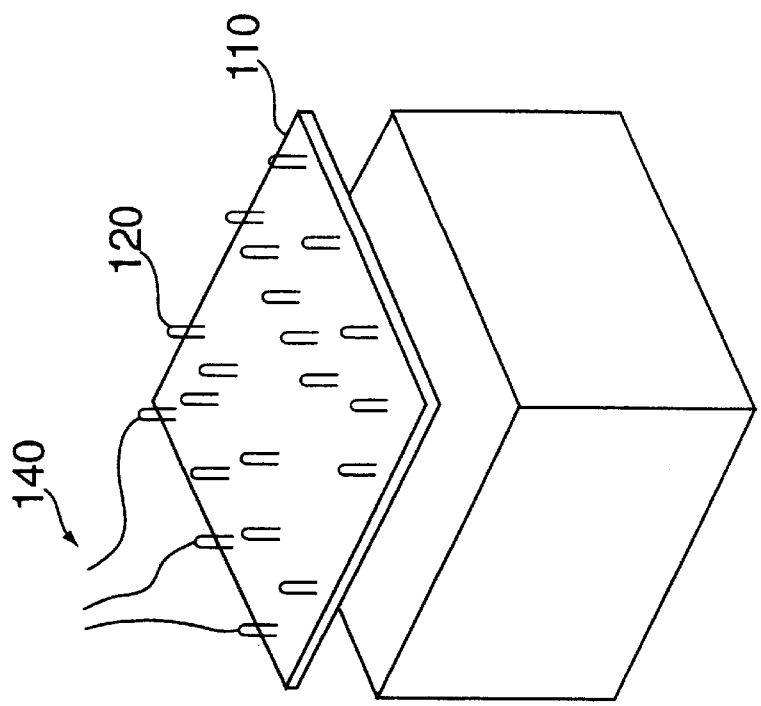
FIGS. 3–5 are drawings of the top of a battery, a battery terminal contact fixture, and a spring-loaded contact for the battery terminal contact fixture, respectively.
Figure 5:
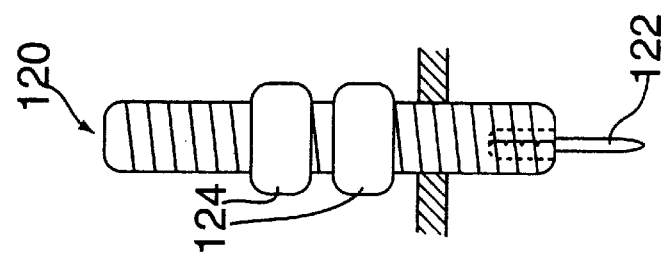
Figure 3:
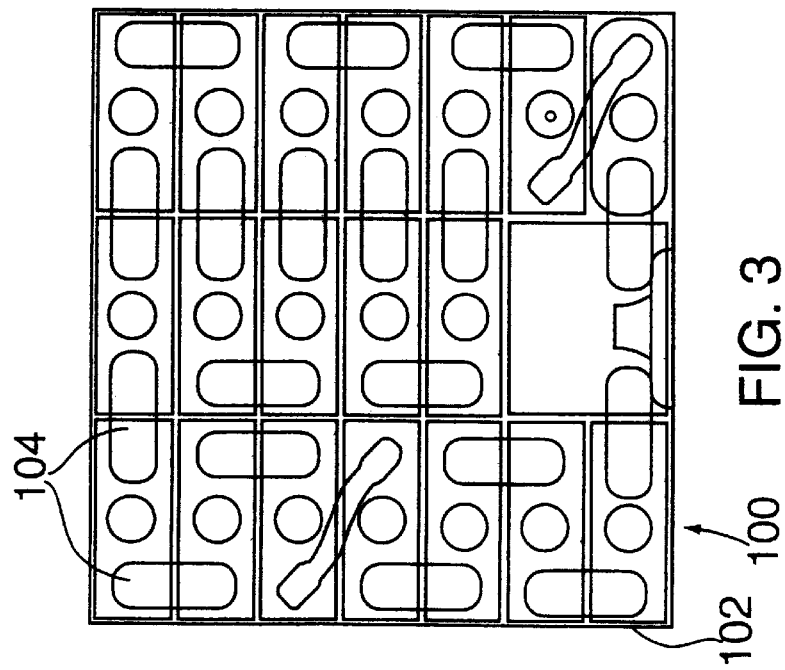

An arrangement for measuring the parameters of individual cells of a battery 100 is shown in FIGS. 3–5. As shown in FIG. 3, the battery 100 has terminals 104 allowing direct electrical access to each of the cells 102. A battery terminal contact fixture 110, shown in FIG. 4, has spring-loaded contacts 120 positioned to make contact with the terminals 104 of the battery cells 102. The contacts 120 can have spring-loaded points 122 and positioning and tightening nuts 124 for adjusting the position of each contact 120. The contact fixture 110 has a substrate or platform 112, manufactured from a suitable insulating material, which supports the spring-loaded contacts 120. Cabling 140

(shown attached to a few exemplary contacts 120) to provide the connections illustrated in FIG. 1 would be connected to the apparatus for measuring resistance (or, more correctly, dV/dl). The cabling may take the form of individual wires, a ribbon cable, or any other suitable arrangement. The current pulse may be provided using a commercially-available power supply such as a Hewlett-Packard Model No. HP-6032A power supply and the parameters may be measured using commercially-available equipment such as a National Instrument Data Acquisition Card No. AT-MIO-16XE-50.

Having generated the tables, plots, or algorithms for the battery in question, a previously untested battery can be tested to determine whether the electrolyte levels in the cells are sufficient. To run the test, the cells are again charged to at least voltage $v_i$ and then a pulse of the proper duration is applied to the battery. The quantity dV/dl is measured for each cell and the indicated quantity of water is added to the cells as dictated by the measurements of dV/dl. The same charge current and pulse width as used to create the tables must be utilized when the test is performed to provide the proper correlation between the measured values of internal resistance and the amount of water to be added. Typically, two iterations of the pulse test, accompanied by the indicated addition of water, are sufficient to reduce the internal resistance of the battery cells to an acceptable level.

The measurements discussed above utilized a direct current pulse. Alternatively, other devices could be used to measure the internal resistance of the cells. For example, a milliohmeter such as the Hewlett-Packard HP4338A could be employed to generate an appropriate set of tables or curves.

An alternative parameter to internal resistance is the polarization value. The polarization value is defined as the change in cell voltage, over the course of a pulse of current of constant value, divided by the amplitude of the pulse (in amps). From the polarization values, one can generate a table similar to those shown above, i.e., polarization values vs. the amount of water that must be added. When utilizing polarization value tables, care must be taken to apply pulses of the same width and magnitude as used to generate the tables.

What is claimed is:

1. A method for determining the amount of water to be added to individual cells of a NiCd storage battery of a given rated capacity, said method comprising the steps of:

measuring(the internal resistance or determining the polarization value sequentially of each of the individual cells of the NiCd battery;

comparing the internal resistance or polarization value for each cell of the NiCd battery against a prior determined table correlating said values and amount of water to be added for a NiCd battery of said given capacity; and adding to each cell individually the amount of water as determined from said prior determined table.

2. The method for determining the amount of water to be added to individual cells of a NiCd battery in accordance with claim 1 wherein the step of measuring the internal resistance of each cell comprises the steps of:

passing a step charge, a pulse, or a discharge pulse of current through each cell, the charge current and pulse width being the same as utilized for the creation of said prior predetermined table; and measuring the resultant differential change in voltage across each cell.

3. The method for determining the amount of water to be added to individual cells of a NiCd battery in accordance with claim 1 wherein the steps of measuring the polarization value of each cell comprises the steps of:

passing constant current through the cell, said constant current being of the same value as utilized for the creation of said prior predetermined table; and measuring the resultant change in voltage across each cell.

4. The method for determining the amount of water to be added to individual cells of a NiCd battery in accordance with claim 2 wherein the step of measuring the internal resistance or polarization of the individual cells includes the step of positioning onto the battery a battery terminal contact fixture having individual spring loaded contacts which physically engage the battery terminals of each of said cells.

* * * * *